United States Patent [19]
Goto et al.

[11] Patent Number: 5,744,028
[45] Date of Patent: Apr. 28, 1998

[54] WATER TREATING APPARATUS

[75] Inventors: Nobutaka Goto, Tokyo, Japan; Peter S. Cartwright, Minneapolis, Minn.

[73] Assignee: Konica Corporation, Japan

[21] Appl. No.: 752,998

[22] Filed: Nov. 21, 1996

[51] Int. Cl.$^6$ .............................. C02F 1/461; C02F 1/32
[52] U.S. Cl. .................... 210/181; 210/192; 210/199; 210/205; 204/269; 222/146.6; 205/701; 205/754; 205/760
[58] Field of Search .................................. 210/181, 192, 210/198.1, 199, 205; 204/268, 269; 205/701, 753, 754, 760; 222/146.6

[56] References Cited

U.S. PATENT DOCUMENTS

| | | | |
|---|---|---|---|
| 3,692,180 | 9/1972 | LaRaus | 210/192 |
| 3,699,776 | 10/1972 | LaRaus | 210/192 |
| 3,915,822 | 10/1975 | Veltman | 205/701 |
| 4,762,613 | 8/1988 | Snowball | 210/192 |
| 5,106,495 | 4/1992 | Hughes | 210/192 |
| 5,449,093 | 9/1995 | Burrows | 222/146.6 |
| 5,531,908 | 7/1996 | Matsumoto et al. | 210/198.1 |
| 5,582,717 | 12/1996 | Di Santo | 210/192 |
| 5,593,563 | 1/1997 | Denoncourt et al. | 205/753 |

Primary Examiner—Peter A. Hruskoci
Assistant Examiner—Theodore M. Green
Attorney, Agent, or Firm—Jordan B. Bierman; Bierman, Muserlian and Lucas

[57] ABSTRACT

A water dispenser including a water tank for storing water supplied from a water bottle; an electrolytic cell including an anode, a cathode, and a three-dimensional carbon electrode provided between the anode and the cathode, the electrolytic cell being provided downstream of the water tank; a water outlet valve provided downstream of the electrolytic cell; and a power supply for applying an electric current to the anode so as to polarize the electrode for sterilizing the water.

3 Claims, 5 Drawing Sheets

5,744,028

WATER TREATING APPARATUS

BACKGROUND OF THE INVENTION

The present invention relates to an apparatus for sterilization-treating electrolytically water to be treated for inhibiting various deteriorations of performance thereof caused by microorganisms of the water to be treated containing microorganisms, or for conducting irradiation of ultraviolet ray in addition to the foregoing, trying to assure smooth operation of the electrolytic treatment, and more particularly, relates to an offer of a dispenser capable of sterilizing bottle water easily and surely and thereby offering safe drinking water.

Heretofore, various types of water solutions, and pure water or the like which does not contain any other materials have been used for various applications. With regard to these water solutions and others, when solutes thereof provide adequate nourishment, or when the temperature of the water solution is relatively high to be suitable for propagation of bacteria, microorganisms such as bacteria breed in the solution so that the microorganisms deteriorate the performance of the solution, or adversely affect products, or float or accumulate in a treating apparatus and frequently damage its function. The number of microorganisms in tap water is generally set to 30/ml or less under the condition that residual chlorine stays in the tap water as a sterilizing agent. When this tap water is used as heat exchanger cooling water, for example, the aforementioned microorganisms breed by leaps and bounds, causing corrosion of piping and generation of an offensive odor.

In order to prevent these phenomena, various chemicals such as anti-mold and sterilizing agents or precipitation inhibiting agents have been added in water to be treated, or various kinds of filters have been installed in piping so far. However, there have been pointed out problems that the water to be treated is adversely affected by chemicals remaining from those added as stated above and a cost is required. Further, antibacterial activities for the chemicals added are started after a certain period of time, causing a problem of necessity for studying the chemicals to be used next and for adding more chemicals than needed. In addition, it is impossible in principle to filtrate and separate live bacteria through filter operations, and everlasting elimination of bacteria is impossible.

With regard to each water to be treated, drinking water, in particular, is directly related to human health. Therefore, exterminations of microorganisms such as sterilization of bacteria contained in the drinking water and prevention of propagation of mold therein are indispensable, and a method by means of chlorine is dominant as a sterilization method or an anti-mold method. However, with regard to sterilization of tap water in urban area, its original water in rivers and lakes are contaminated with various kinds of organic matters, requiring addition of more chlorine than is needed. Therefore, there are caused disadvantages such as generation of organic halides and generation of the smell of bleach. In order to eliminate the aforementioned disadvantages caused by the method employing chlorine, there have been suggested sterilization methods employing those other than chlorine.

Further, natural water is sold in the market as bottle water, and it also contains various microorganisms.

For overcoming the aforementioned disadvantages in water to be treated, especially in bottle water, inventors of the invention attempt to propose a water treatment apparatus and a water treatment method wherein the above-mentioned water to be treated is fed to an electrolytic cell equipped with an electrode of a carbon 3-D fixed bed type (hereinafter referred simply to also as a 3-D electrolytic cell) housing therein a plurality of electrodes of a carbon 3-D fixed bed type (hereinafter referred to also as a carbon electrode) to be treated electrolytically so that microorganisms in the water to be treated are sterilized.

This electrolytic sterilization method in a dispenser equipment is one wherein electricity is supplied to the aforesaid carbon electrode and thereby the electrode is polarized and microorganisms coming in contact with electrodes mainly polarized to be positive are sterilized as long as electricity keeps to be supplied.

However, taking out of water from a dispenser equipment using bottle water is irregular, and during a suspension period up to the next taking out of water, microorganisms existing between an electrolytic cell and an outlet of treated water are propagated, thus microorganisms are contained in treated water taken out.

SUMMARY OF THE INVENTION

An object of the invention is to provide a water treatment method which can eliminate the risk mentioned above.

The object mentioned above can be attained by either of the following technical means (1) and (2).

(1) A water treatment method for treating water contained in a dispenser equipment by providing an electrolytic cell equipment with electrodes of a carbon 3-D fixed bed type are installed as a sterilizing equipment for the dispenser equipment having a water outlet valve, wherein the electrolytic cell equipment with electrodes of a carbon 3-D fixed bed type is positioned to be close to the upstream side of the outlet valve.

(2) A water treatment method for treating water contained in a dispenser equipment by providing an electrolytic cell equipment with electrodes of a carbon 3-D fixed bed type are installed and an ultraviolet irradiation equipment as a sterilizing equipment for the dispenser equipment at the upstream side of a water outlet valve, wherein the electrolytic cell equipped with electrodes of a carbon 3-D fixed bed type is positioned at the upstream side of the ultraviolet irradiation equipment.

DETAILED DESCRIPTION OF THE INVENTION

Figure 1:
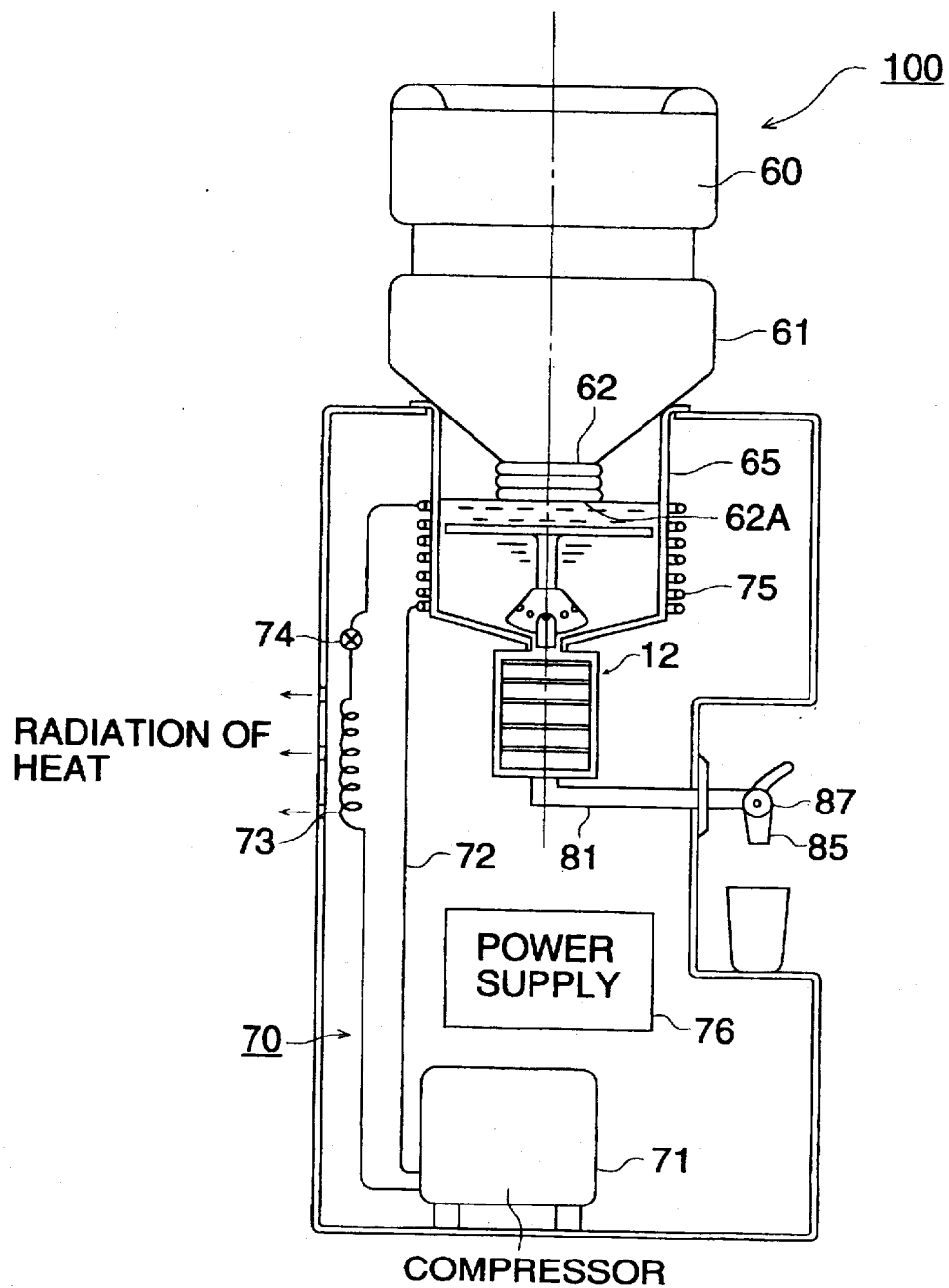
FIG. 1 is a schematic structural diagram of a dispenser equipment used in a water treatment method of the invention.

Working of the invention will be explained in detail as follows.

The method of the working of the invention is to sterilize microorganisms contained in drinking water and bottle water used as reservoir water in a dispenser of a cup type, and it relates to operation methods of an electrolytic cell, an ultraviolet irradiation equipment and a dispenser equipment provided with a valve to take out treated water for supplying the water to be treated to the electrolytic cell equipped with an electrode of a carbon 3-D fixed bed type, and impressing D.C. or A.C. voltage on the electrolytic cell to sterilize microorganisms in the aforementioned water to be treated. The microorganisms in the invention include bacteria, germs, mold fungus, colon bacilli, yeast, slime mold, algae of a single cell, protozoans and viruses.

It is considered that when water to be treated mentioned above is supplied to an electrolytic cell equipped with energized carbon electrodes, microorganisms in the water to be treated are brought by the liquid flow into contact with the polarized electrodes where the microorganisms receive energy at high voltage and powerful oxidation reaction takes place in a cell of the microorganisms accordingly, thus, its activity is weakened and microorganisms themselves are annihilated for sterilization.

In the above-mentioned electrolytic treatment of water to be treated, sterilization of microorganisms can be conducted as long as the carbon electrode mentioned above is polarized properly and the supplied water to be treated is surely brought into contact with an anode which is polarized to be positive with voltage of 0.7 V (vs SCE) on the carbon electrode, but when either of the aforesaid two conditions is not satisfied, a sterilizing effect for microorganisms in treated water taken out of the electrolytic cell can not be high.

Generally, ranges of the conditions suitable for electrolytic treatment are 5°–45° C. for temperature of water to be treated, 5–30 mm/sec for a value of linear velocity LV for passage in the electrolytic cell, 0–5000 μs/cm for electric conductivity of water to be treated, 2.0–8.0 V/electrolytic cell for electrolytic voltage, and 0–5.0 A/dm$^2$ for current density, and when the relation between a height of a carbon electrode housed in the electrolytic cell and the aforesaid linear velocity satisfies the following inequality, the water to be treated can be treated efficiently.

[Electrolytic cell height H (mm)]/[Linear velocity LV value (mm/sec)]≧1.0 (sec) In this case, the height of the electrolytic cell H is a height of an electrode of a carbon 3-D fixed bed type, and when plural electrodes are insulated each other and laminated, the total value thereof is a height in mm.

The linear velocity LV value is a linear velocity in mm/sec at which the water to be treated runs through porous thin holes in the electrode of a carbon 3-D fixed bed type. Since these values vary while connecting them with each other, even when either of them is within the range, concentration of microorganisms is not necessarily at a satisfactory low level, while even when either value of them is out of the range, the concentration of microorganisms is sometimes within a satisfactory low level, which can be a good guide to continuation of normal operation.

Especially, when water to be treated passes through the inside of a 3-D electrolytic cell spending the time represented by the above inequality, sterilization efficiency is high.

It was further found that the electrolysis efficiency is further stabilized when the linear velocity LV value is 30 mm/sec or less in addition to the condition mentioned above.

The basis for the above is that a turbulent flow in water to be treated is needed for the water to be treated to come to a polarized surface of the polarized electrode of a carbon 3-D fixed bed type. However, when the linear velocity LV value is too great, a period of time for microorganisms in the water to be treated to be in contact with the aforesaid polarized surface is short, causing low efficiency. Therefore, the upper limit value which does not lower the efficiency is the LV value stated above. While, the lower limit of the LV value is 1–2 mm/sec which is a speed for generating a laminar flow.

An electrolytic cell used in a method of the invention is an electrolytic cell equipped with electrodes of a carbon fixed bed 3-D type, namely, an electrolytic cell with a carbon electrode of a fixed bed mono-electrode type and an electrolytic cell with carbon electrodes of a 3-D fixed bed multi-electrode type. In these electrolytic cells, each of 3-D electrodes in the electrolytic cell has a large surface area, and accordingly, it is possible to increase a contact area between the surface of an electrode and water to be treated, and thereby it is possible to make the apparatus size small and to enhance efficiency of electrolytic treatment, which is an advantage.

An electrode in an electrolytic cell equipped with carbon electrodes of a fixed bed 3-D type used in the invention generally includes a carbon electrode presenting a polarizing phenomenon and an electrode for supplying electric power. The carbon electrode has its shape matching the aforementioned electrolytic cell to be used, and when an electrolytic cell with carbon electrodes of a 3-D fixed bed multi-electrode type is used, it is feasible that the carbon electrode is made of carbon materials capable of transmitting the water to be treated mentioned above, for example, of carbon type materials such as activated carbon, graphite or carbon fiber each being felt-shaped, woven-cloth-shaped, and porous-block-shaped, and there is prepared an electrolytic cell with electrodes of a fixed bed multi-electrode type housing therein 3-D electrodes wherein D.C. voltage, A.C. voltage with 10 Hz or less is impressed between power-supply-electrodes each being made of porous plate that is flat-plate-shaped, expand-mesh-shaped or perforated-plate-shaped installed at both ends of the carbon electrode to polarize the aforesaid carbon electrode so that an anode can be formed on one end of the polarized electrode and a cathode can be formed on the other end thereof. In addition to the foregoing, it is also feasible to prepare an electrolytic cell with carbon electrodes of a 3-D fixed bed multi-electrode type wherein carbon 3-D material functioning as an anode independently and carbon 3-D material functioning as a cathode independently are arranged alternately so that they are not short-circuited and are connected electrically.

Since the aforementioned electrode is made of carbon, it is oxidized by oxygen gas which is an electrolytic reaction product and an electrode crumbling sometimes takes place as carbon dioxide. For avoiding this, an electrode material wherein a base material such as titanium or the like is covered with platinum metallic oxide such as iridium oxide, ruthenium oxide or the like, or a porous electrode material wherein a base material such as porous material used generally as infusible metal electrode or titanium is covered with platinum metal through plating or the like can be provided to be in contact so that generation of oxygen may take place mainly on the porous metallic electrode material.

It is preferable that an average diameter of an opening of the aforementioned carbon electrode is 25–300 μm. When the carbon electrode is housed in the electrolytic cell for treating water to be treated, drinking water for example, characteristics of the carbon electrode have an influence on how the water to be treated can flow easily or on electrolysis voltage. A diameter of an opening of the carbon electrode also has an influence which is relatively strong, and when the diameter of an opening of the carbon electrode is great, the water to be treated can pass through the electrolytic cell without coming in contact with the electrode, resulting in lowered efficiency of sterilization of microorganisms. When the diameter of an opening is small, on the contrary, it is impossible for the water to be treated to pass through the carbon electrode, pressure loss of liquid flow in the electrolytic cell is caused.

According to the studies of the inventors of the invention, when a diameter of an opening of a carbon 3-D electrode is smaller than 25 µm, a sharp rise in electrolysis voltage is caused, while when it exceeds 300 µm, a sharp fall of current efficiency (sterilization efficiency) is caused, thus, satisfactory effect (sterilization efficiency) can not be attained in both cases. When a carbon electrode is used for an electrolytic cell in a method of the invention, therefore, it is preferable that an average diameter of an opening thereof is made to be 25–300 µm as stated above. Porosity of the carbon electrode [(volume of void in electrode)÷(total volume of electrode)×100 (%)] is 20–80% and it is preferably 30–60%. The prosity of the carbon electrode can be measured by normal Bet measurement method.

It is possible to manufacture a carbon electrode having a desired diameter of an opening in the following method.

For example, when forming a carbon electrode by sintering carbon particles, it is possible to make a carbon electrode having an arbitrary diameter of an opening by adjusting a diameter of an opening of the carbon electrode by means of adjustment of a particle size of a carbon particle to be used. Sintering temperature for graphitizing in this case is 1000°–4000° C. In another method, sheets of cellulose paper each having a predetermined diameter of an opening are laminated to be graphitized at the similar sintering temperature.

When using an electrolytic cell with electrodes of a mono-electrode fixed bed type, a piece of 3-D material is provided in the electrolytic cell through a diaphragm or without a diaphragm, or a plurality of 3-D materials are provided in a single electrolytic cell in the state of the same electrolysis voltage.

Regardless of a type of the electrode to be used, when a void through which the water to be treated can flow without touching the electrode, exists in the electrolytic cell in which the water to be treated flows, efficiency of treating water to be treated is lowered. It is therefore preferable to arrange electrodes in the electrolytic cell so that the water to be treated in the electrolytic cell may not shortcut without touching the electrode.

Even when an anode chamber and a cathode chamber are formed by partitioning the inside of the electrolytic cell with a diaphragm, it is possible to supply electric power without using the diaphragm, but when using no diaphragm and narrowing the distance between poles of an electrode, it is possible to insert between both poles a net-shaped spacer made of organic high molecular material, for example, as an insulating spacer for preventing short-circuiting. When using a diaphragm, it is preferable to use a porous diaphragm such as, for example, one having a rate of hole area of not less than 10% and not more than 95%, preferably, not less than 20% and not more than 80%, so that a movement of flowing water to be treated is not disturbed, and the diaphragm is required to have fine holes each being enough in diameter at least to pass the above-mentioned water to be treated through.

Conditions for operating the electrolytic cell having the aforesaid constitution are preferably established so that sterilization efficiency for microorganisms in water to be treated may be highest.

When conducting electrolytic treatment in an electrolytic cell for water, there are available one-pass treatment and circulation treatment. For electrolytic treatment for drinking water, for example, it is difficult to use a circulation treatment though the sterilization efficiency rises in the circulation treatment. Therefore, one-pass treatment is usually used for electrolytic treatment of drinking water. In the one-pass treatment, it is preferable that liquid hourly space velocity of water to be treated, in particular, among conditions for electrolysis, is made to be small to the utmost to make the staying time of the water to be treated in the electrolytic cell longer.

With regard to electrode voltage in the course of supplying water to be treated, it is preferable that anode voltage is set to be not more than +1.2 V (vs.SHE) and not less than +0.2 V (vs. SHE). When the voltage is within this range, generation of oxygen gas and hydrogen gas caused at both poles by ordinary electrolytic reaction is very small in quantity and they are hardly observed. Therefore, it is not necessary to consider generated gas which does not contribute to sterilization of the aforesaid microorganisms. Incidentally, it is preferable that a filtration device having a filter with an aperture of 10 µm or less, and of 5 µm or less for further certainty, is provided at an outlet of the electrolytic cell so that dead bodies of microorganisms and fine dust of crushed carbon electrodes sterilized by electrolytic treatment may be filtrated.

Reliability and a feeling of security for sterilization of microorganisms conducted by the dispenser can be enhanced by providing the electrolytic cell like that mentioned above and further providing an ultraviolet irradiating unit at a location close to an outlet for treated water at the downstream side of the electrolytic cell.

Next, preferable examples of an electrolytic cell usable for the invention will be explained as follows, referring to the attached drawings. However, the invention is not limited to the examples.

FIG. 1 is a schematic structural diagram of a dispenser used in the water treatment method of the invention. Bottle 61 for bottle water 60 is installed at a fixed position on water tank 65 of dispenser 100. In that case, outlet 62 of the bottle 61 is also located at the fixed position on the water tank 65. Bottle water 60 in the bottle 61 keeps flowing into the water tank 65 until end surface 62A of the outlet 62 is aligned to a water level in the water tank 65. Under this state, bottle water 60 in the bottle 61 stops flowing out, thus, the water level in the water tank 65 stays to be aligned with the end surface 62A of the outlet 62. When water in the water tank 65 is consumed, the water level is lowered, and water in an amount equivalent to an amount corresponding to the lowered water level is replenished from the bottle 61 and thereby the water level is restored to its balanced initial level.

On the other hand, an outlet at the lower portion of the water tank 65 is connected to an inlet of electrolytic cell 12, an outlet of the electrolytic cell 12 is connected to pipe 81, outlet 87 for taking out water at the final end of the pipe 81 is provided with valve (take-out valve) 85, thus, clean water treated in the dispenser equipment 100 can be received from the outlet (water supply port) 87.

On the water tank 65, on the other hand, there are provided compressor 71, cooling pipe 72, heat radiating section 73, expansion valve 74 and heat absorption section 75 of heat pump 70 forming its loop, so that water in the water tank can be cooled. The heat radiating section 73 is provided on the outer wall in the rear of the dispenser equipment 100 so that heat may be radiated from that position.

Inside the dispenser equipment 100, there are installed a power supply 76.

Treated water in a necessary amount wherein microorganisms have been sterilized by the electrolytic cell 12 is supplied through opening/closing of the valve 85.

Figure 2:
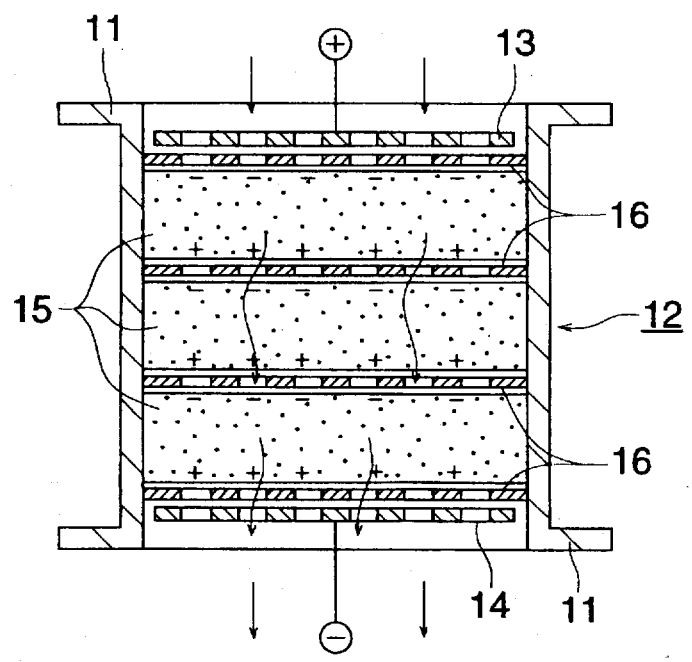
FIG. 2 is a schematic longitudinal cross section showing another example of an electrolytic cell equipped with electrodes of a multi-electrode carbon packed 3-D bed type usable in the method of the invention.

FIG. 2 represents an example of an electrolytic cell with electrodes of a multi-electrode fixed bed type usable as another electrolytic cell of dispenser equipment 100.

Cylindrical electrolytic cell main body 12 having flange 11 on each of its top and bottom is provided at its upper portion and lower portion inside therein respectively with power-supplying anode terminal 13 and power-supplying cathode terminal 14 both being mesh-shaped. Between these electrode terminals 13 and 14, there are laminated plural, three in the illustrated example, porous electrodes of a carbon fixed bed type 15, and four mesh-shaped diaphragms or spacers 16 are sandwiched between the carbon electrodes 15, between the carbon electrode 15 and the electrode terminal 13 and between the carbon electrode 15 and the electrode terminal 14. Each carbon electrode 15 is arranged to be in close contact with the inner surface of the electrolytic cell main body 12 so that an amount of water to be treated flowing between the carbon electrode 15 and the inner surface of the electrolytic cell main body 12 without passing through the inside of the carbon electrode 15 may be small to the utmost.

When energizing the electrolytic cell having the constitution mentioned above while supplying bottle water 60 thereto from the above of the electrolytic cell as shown by an arrow, each of the fixed bed electrode 15 is polarized to be positive at its bottom surface and negative at its top surface and a porous anode is formed on the bottom surface of each fixed bed electrode 15, thus, the bottle water 60 comes in contact with this porous anode to be sterilized, and then is taken out to the lower portion of the electrolytic cell to be guided to an outlet.

Figure 3:
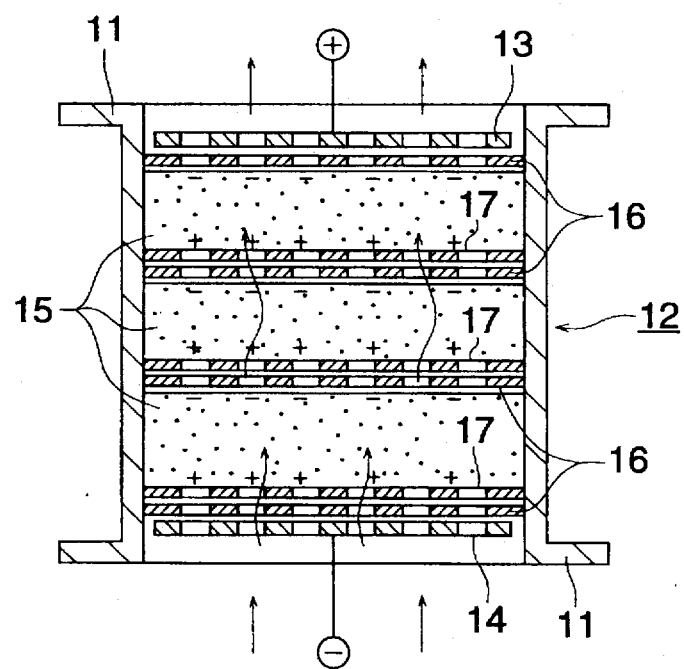
FIG. 3 is a schematic longitudinal cross section showing still another example of an electrolytic cell equipped with electrodes of a multi-electrode carbon 3-D fixed bed type usable in the method of the invention.

FIG. 3 shows another example of an electrolytic cell with electrodes of a multi-electrode fixed bed type of dispenser 100 usable in the method of the invention wherein mesh-shaped infusible metal electrode 17 is provided to be in close contact with the side of the carbon electrode 15 of the electrolytic cell in FIG. 2, namely the side to be polarized to be positive, and other members are the same as those in FIG. 2, therefore, they are given the same symbols and explanation therefor will be omitted here.

Carbon electrode 15 impressed with D.C. voltage is polarized to the utmost at its both ends, and when generation of gas is caused, gas generation tends to occur at both ends of the carbon electrode 15. Therefore, an end portion of the carbon electrode 15 polarized most strongly, namely subjected to gas generation most actively, and is closer to power supplying cathode 14 is subjected to oxidation reaction and dissolution reaction of base material of an electrode which are quickest and most active. When this portion is provided with infusible metal electrode 17 as illustrated, oxygen gas is mostly generated from the infusible metal electrode 17 and carbon electrode 15 hardly generates oxygen gas, resulting in effective inhibition of crumbling of the carbon electrode 15. Bottle water 60 supplied to the electrolytic cell 12 is treated in the same manner as in FIG. 2 and microorganisms in the bottle water 60 are sterilized.

EXAMPLE

The invention will be explained in detail as follows, referring to the examples to which an embodiment of the invention is not limited.

There will be explained as follows an example of treatment of water to be treated such as drinking water or the like, which is from bottle water 60, and the examples do not limit the methods of the invention.

Example 1

An electrolytic cell of dispenser equipment 100 used in the present example of the water treatment method of the invention was prepared in accordance with the following constitution.

The electrolytic cell was provided at the upstream side of treated water outlet valve 85 to be close thereto.

In a cylindrical electrolytic cell with flanges made of transparent hard polyvinyl chloride resin having a height of 75 mm and inside diameter of 40 mm shown in FIG. 2, there were put five fixed beds (porous graphite, made by Tokai Carbon Co.) made of carbon material and having a diameter of 39.5 mm and a thickness of 10 mm, and they were sandwiched be six polyethylene-resin-made diaphragms each having a rate of hole area of 80%, a diameter of 40 mm and a thickness of 1 mm, in a way that each fixed bed was sandwiched by the diaphragms. Then, mesh-shaped power supply anode and cathode each being made of titanium that is plated with platinum, having a diameter of 38 mm and a thickness of 1 mm were brought into contact respectively with the top diaphragm and the bottom diaphragm. Thus, the electrolytic cell of the present example was prepared.

Bottle water 60 for testing was prepared by adding microorganisms to the water to be treated at the rate of 800 pieces/ml.

Figure 4:
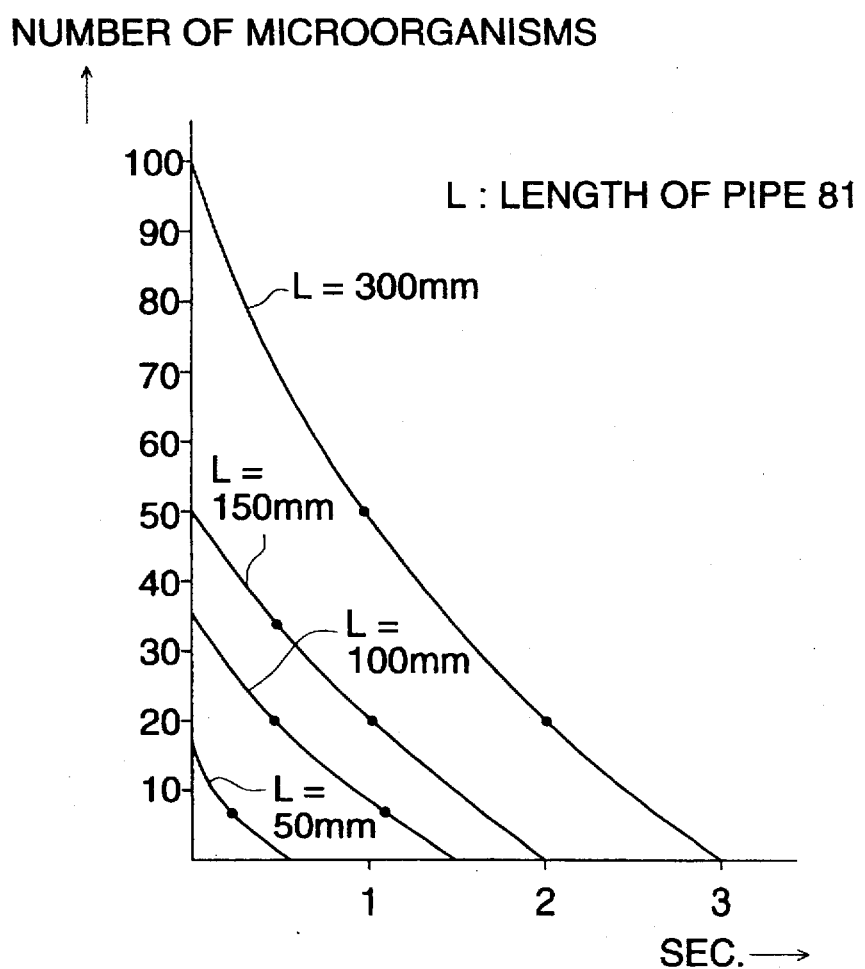
FIG. 4 is a graph showing the relation between a length from an electrolytic cell of a dispenser equipment to an outlet for treated water and sterilizing effects.

Then, the water to be treated for testing was subjected to electrolytic treatment by supplying it to the electrolytic cell from its top at the rate of 1.5 l/min.(treatment amount or treatment speed) and by picking up 25 cc of treatment water at intervals of 12 minutes and by repeating energizing for 5 minutes and suspension for 7 minutes using D.C. voltage as shown in FIG. 4 and thereby adjusting to obtain apparent current density of 0.2 A/dm2 and electrolytic voltage of 4.3–8.8 V (average electrolytic voltage 5.8 V), thus, electrolytic treated water was sampled and was cultured for three days, during which the number of microorganisms was counted hourly. Results of them are shown in Table 1.

TABLE 1

| Operation time (min.) | Micro-organism concentration (pcs./ml) | Temperature of water to be treated (°C.) | Amount of water to be treated (l/min.) | Conductivity of water to be treated (μs/cm) | Electrolytic voltage (V) | Current (mA) | Number of microorganisms in treated water (pcs/ml) |
|---|---|---|---|---|---|---|---|
| 0 | 855 | 22 | 1.50 | 264 | 5.7 | 27 | 0 |
| 12 | 838 | 23 | 1.51 | 260 | 5.7 | 29 | 0 |

TABLE 1-continued

| Operation time (min.) | Micro-organism concent-ration (pcs./ml) | Tempera-ture of water to be treated (°C.) | Amount of water to be treated (l/min.) | Conduc-tivity of water to be treated (μs/cm) | Electrolytic voltage (V) | Current (mA) | Number of micro-organisms in treated water (pcs/ml) |
|---|---|---|---|---|---|---|---|
| 24 | 841 | 22 | 1.50 | 260 | 5.6 | 31 | 1 |
| 36 | 857 | 24 | 1.51 | 258 | 5.7 | 30 | 0 |
| 48 | 880 | 23 | 1.50 | 261 | 5.6 | 30 | 0 |
| 60 | 845 | 23 | 1.52 | 260 | 5.8 | 28 | 0 |

Example 2

Next, the dispenser and its electrolytic cell same as those in Example 1 were used for Example 2, and an amount of water to be treated was increased with the passage of time of operation intentionally. The treated water was taken out for sampling in the same manner as in Example 1, and each of them was cultured for three days, during which the efficiency of sterilizing microorganisms was examined through comparison. Results of them are shown in Table 2.

However, in the case of changes of the conditions such as a change of flow rate of water to be treated and reduction of voltage for electrolysis as shown in Examples 2 and 3, the number of microorganisms in water picked up from the outlet 87 increases to be out of a satisfactory level, which is not preferable. On the contrary, it is understood that water taken out of the outlet 87 under the operation conditions within a range shown in Example 1 can maintain the preferable state of no microorganism.

TABLE 2

| Operation time (min.) | Micro-organism concent-ration (pcs./ml) | Tempera-ture of water to be treated (°C.) | Amount of water to be treated (l/min.) | Conduc-tivity of water to be treated (μs/cm) | Electrolytic voltage (V) | Current (mA) | Number of micro-organisms in treated water (pcs/ml) |
|---|---|---|---|---|---|---|---|
| 0 | 838 | 22 | 1.95 | 259 | 5.6 | 27 | 15 |
| 12 | 844 | 23 | 2.01 | 260 | 5.6 | 27 | 7 |
| 24 | 847 | 22 | 1.93 | 255 | 5.6 | 26 | 28 |
| 36 | 840 | 23 | 1.95 | 262 | 5.5 | 27 | 15 |
| 48 | 850 | 22 | 1.88 | 257 | 5.5 | 27 | 7 |
| 60 | 844 | 23 | 1.90 | 254 | 5.7 | 28 | 10 |

Example 3

Next, the dispenser and its electrolytic cell same as those in Example 1 were used for Example 3, and electrolytic voltage was decreased with the passage of time of operation intentionally. The treated water was taken out for sampling in the same manner as in Example 1, and each of them was cultured for three days, during which the efficiency of sterilizing microorganisms was examined through comparison. Results of them are shown in Table 3.

However, in the case of this dispenser equipment 100, a phenomenon that microorganisms increase in number takes place in pooled water in pipe 81 located between an outlet of the electrolytic cell and outlet 87 for taking out water when the water therein stays there for a long time. The inventors of the invention conducted experiments shown in Example 4 by operating again after a long time of suspension, concerning the relation between a length of pipe 81 and efficiency of sterilization.

TABLE 3

| Operation time (min.) | Micro-organism concent-ration (pcs./ml) | Tempera-ture of water to be treated (°C.) | Amount of water to be treated (l/min.) | Conduc-tivity of water to be treated (μs/cm) | Electrolytic voltage (V) | Current (mA) | Number of micro-organisms in treated water (pcs/ml) |
|---|---|---|---|---|---|---|---|
| 0 | 855 | 22 | 1.50 | 259 | 4.0 | 13 | 48 |
| 12 | 848 | 23 | 1.51 | 255 | 3.7 | 12 | 55 |
| 24 | 853 | 23 | 1.50 | 251 | 3.6 | 14 | 60 |
| 36 | 853 | 23 | 1.51 | 263 | 3.8 | 12 | 42 |
| 48 | 862 | 24 | 1.50 | 258 | 4.0 | 12 | 53 |
| 60 | 851 | 23 | 1.50 | 255 | 3.9 | 12 | 55 |

As a result of the foregoing, it was found that the number of microorganisms in water picked up from the outlet 87 for taking out water is on a satisfactory level if it is based on the conditions shown in Example 1.

Example 4

When a dispenser equipment is re-energized after its suspension for one hour from the stop of energizing made after the normal taking out of water under energizing of the dispenser equipment, the number of microorganisms in water taken out immediately after the re-energizing is about 100 pcs/ml on the assumption that a length (L) of pipe 81 is 300 mm, and a level of mostly zero in terms of the number of microorganisms was attained by water taken out after 3 seconds from the re-energizing. When the length (L) of pipe 81 is 150 mm, the number of microorganisms in water taken out immediately after the re-energizing is about 50 pcs/ml and a level of mostly zero in terms of the number of microorganisms was attained by water taken out after 2 seconds from the re-energizing. Further, when the length (L) of pipe 81 is 100 mm, the number of microorganisms in water taken out immediately after the re-energizing is about 35 pcs/ml and a level of mostly zero in terms of the number of microorganisms was attained by water taken out after 1.5 seconds from the re-energizing. When the length (L) of pipe 81 is 50 mm, the number of microorganisms in water taken out immediately after the re-energizing is about 15 pcs/ml and a level of mostly zero in terms of the number of microorganisms was attained by water taken out after 0.5 seconds from the re-energizing.

FIG. 4 shows the foregoing in a form of a graph.

Therefore, it is understood that the shorter the length (L) of pipe 81 up to the outlet 87 of the dispenser equipment 100 is, the better the result is.

Example 5

Figure 5:
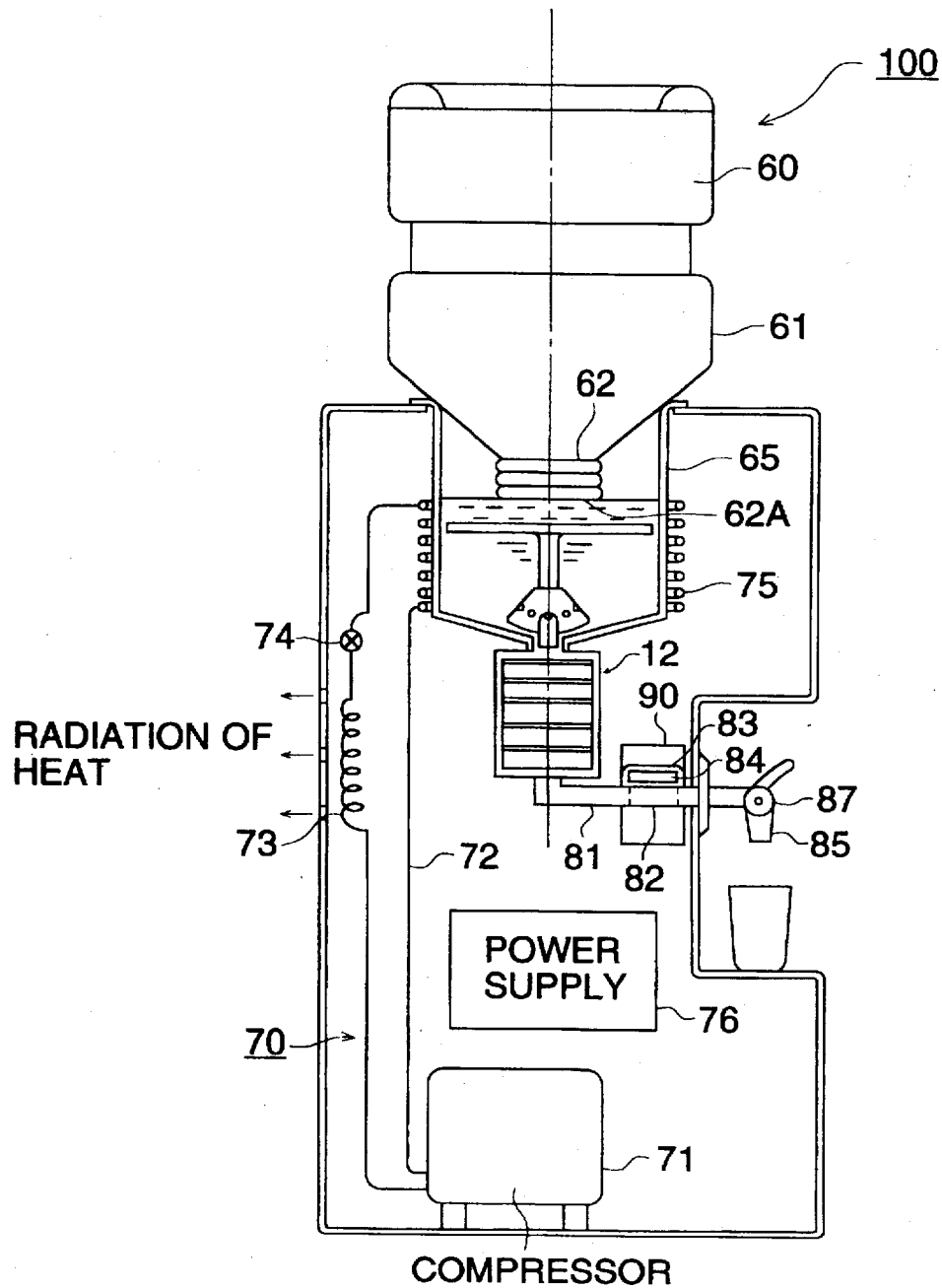
FIG. 5 is a schematic structural diagram wherein an ultraviolet irradiation equipment is added to a dispenser equipment used in a water treatment method of the invention.

Incidentally, when the same tests were conducted in Examples 1, 2 and 3 under the condition that ultraviolet irradiating unit 90 is connected as shown in FIG. 5, the number of microorganisms per milliliter in treated water in each of Tables 2 and 3 was extremely reduced to be almost zero, similarly to the results of Table 1. It can be said, therefore, that the sterilization efficiency is higher in the case that ultraviolet rays are irradiated than in the case where an electrolytic cell only is provided. In addition, it is hard, from the viewpoint of the structure of the dispenser equipment, to make the length of the pipe 81 mentioned above to be equal to or less than a certain value. As shown in FIG. 5, when eliminating the limitation for the effect of a means for shortening pipe 81, the great effect can be attained in the constitution wherein a transparent material is used for part 82 of pipe 81 on which ultraviolet irradiating lamp 84 and reflecting mirror 83 are provided.

When water to be treated, especially, bottle water, is supplied to an electrolytic cell provided with a fixed type 3-D electrode, or to an ultraviolet irradiating unit to be connected thereto, microorganisms in the water to be treated come into contact with a voltage-donated carbon electrode where they further come into contact with high-voltage current on the surface of the electrode to be subjected to powerful oxidation reaction, or to attenuation of their activities, or to their extinction, thus the microorganisms are sterilized.

In the dispenser using bottle water, it is not used frequently but is used intermittently. Even in that case, it is possible to enhance sterilization efficiency sufficiently by controlling energizing time or by making the length of a pipe from an electrolytic cell to an outlet for water to be short to the utmost. Further, it has become possible to enhance a multiplier effect of sterilization efficiency by employing both an electrolytic cell and an ultraviolet irradiating unit.

What is claimed is:

1. A water dispenser comprising:

a water tank for storing water supplied from a water bottle, said water bottle being arranged to maintain an outlet of said water bottle at a fixed position in said water dispenser;

an electrolytic cell including an anode, a cathode, and a three-dimensional carbon electrode between the anode and the cathode, the electrolytic cell being below the water tank to produce a flow of water from an outlet of said water tank into and through said electrolytic cell;

a water outlet valve downstream of the electrolytic cell; and a power supply for applying an electric current between the anode and the cathode so as to polarize the electrode, thereby sterilizing the water.

2. The water dispenser of claim 1 further comprising an ultraviolet irradiation equipment between the electrolytic cell and the water outlet valve.

3. The water dispenser of claim 1 further comprising a heat absorption member in the water tank.

* * * * *